US006797105B1

(12) United States Patent
Schumann et al.

(10) Patent No.: US 6,797,105 B1
(45) Date of Patent: Sep. 28, 2004

(54) METHOD FOR PRODUCING HEAT BONDED PACKAGES AND TOOL FOR IMPLEMENTING SAID METHOD

(75) Inventors: Klaus Schumann, Neuwied (DE); Frank Seibertz, Bad Hönningen (DE); Peter Steinborn, Neuwied (DE)

(73) Assignee: LTS Lohmann Therapie-Systeme AG, Andernach (DE)

( * ) Notice: Subject to any disclaimer, the term of this patent is extended or adjusted under 35 U.S.C. 154(b) by 0 days.

(21) Appl. No.: 09/763,267

(22) PCT Filed: Aug. 2, 1999

(86) PCT No.: PCT/EP99/05608

§ 371 (c)(1),
(2), (4) Date: Apr. 16, 2001

(87) PCT Pub. No.: WO00/10795

PCT Pub. Date: Mar. 2, 2000

(30) Foreign Application Priority Data

Aug. 20, 1998 (DE) .......................... 198 37 763

(51) Int. Cl.$^7$ ............................ B32B 31/08; B32B 31/20
(52) U.S. Cl. .................... 156/282; 156/308.2; 156/308.4
(58) Field of Search ............................... 156/155, 182, 156/228, 273.7, 282, 290, 308.2, 308.4, 311, 358, 361, 379.6, 379.8, 379.9, 380.6, 539, 543, 275.1

(56) References Cited

U.S. PATENT DOCUMENTS

| 2,764,862 A | 10/1956 | Rado | |
|---|---|---|---|
| 3,777,454 A | 12/1973 | Van Manen | |
| 3,813,846 A | * 6/1974 | Doering, Jr. | ................ 156/516 |
| 3,830,681 A | * 8/1974 | WIlson | ..................... 156/583.2 |
| 4,372,098 A | 2/1983 | Mason | |
| 5,131,213 A | * 7/1992 | Shanklin et al. | ............ 156/515 |
| 5,204,181 A | * 4/1993 | Suzuki et al. | ............... 428/344 |

FOREIGN PATENT DOCUMENTS

| AT | 329454 | 7/1975 |
|---|---|---|
| DE | 1 704 041 | 7/1967 |
| DE | 27 40 176 | 5/1978 |
| DE | 36 38 627 A1 | 5/1988 |
| DE | 3824924 A1 | 1/1990 |
| DE | 196 20 560 A1 | 11/1997 |
| EP | 0 541 188 A1 | 5/1993 |
| GB | 532018 | 1/1941 |
| GB | 1 383 428 | 2/1975 |
| GB | 1 582 777 | 1/1981 |

* cited by examiner

Primary Examiner—Richard Crispino
Assistant Examiner—Sing Po Chan
(74) Attorney, Agent, or Firm—D. Peter Hochberg; Sean Mellino; Katherine R. Vieyra

(57) ABSTRACT

The invention relates to a process for producing hot-seal packs, in particular for transdermal therapeutic systems, by welding to one another, at predetermined linear regions and at polymer layers facing towards one another, two laps of continuous pack material composed of two or more layers. To this end, one (or two) sealing tool(s) are used to bring the pack material into contact with pressure and heat. To improve the quality of the welded seams without altering the cycle rate, according to the invention the sealing time is doubled and the temperature of the sealing tool(s) (1, 2) is reduced so that there is a considerable reduction in the temperature reached within the pack material (3, 4), this temperature then being only slightly above the melting point of the polymer used. An example of a sealing tool (1, 2) is given (FIG. 1).

5 Claims, 1 Drawing Sheet

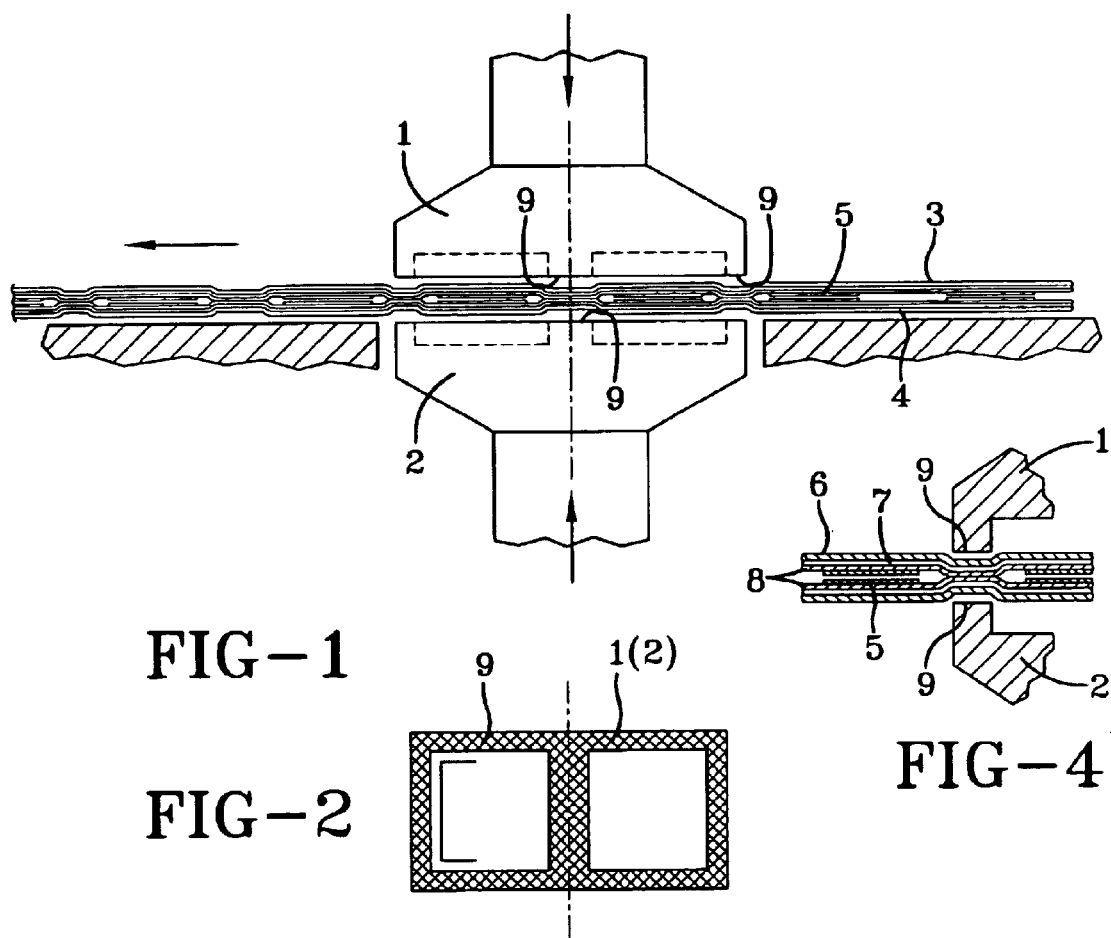
FIG-1
FIG-2
FIG-4
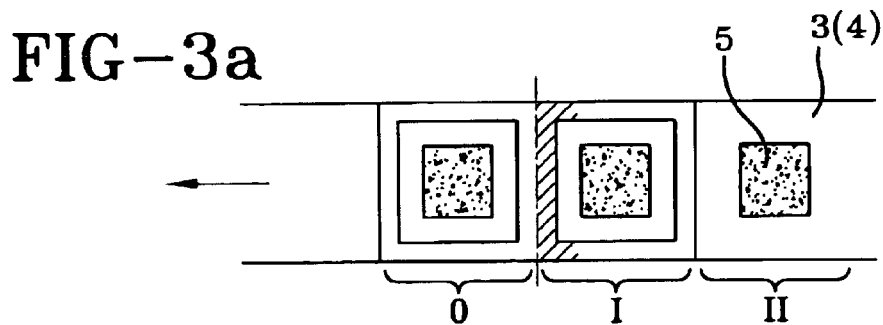
FIG-3a
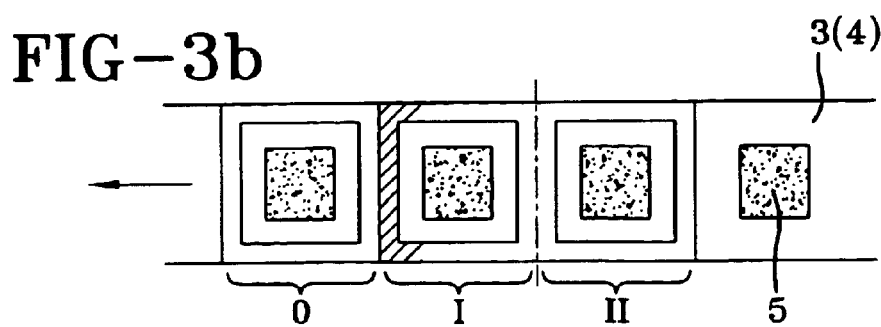
FIG-3b

METHOD FOR PRODUCING HEAT BONDED PACKAGES AND TOOL FOR IMPLEMENTING SAID METHOD

BACKGROUND OF THE INVENTION

1. Field of the Invention

The invention relates to a process for producing hot-seal packs by welding, in particular for transdermal therapeutic systems (TTSs), and to a tool for carrying out the process.

2. Description of Prior Art

A known method for producing hot-seal packs for TTSs is to use two laps of packaging laminates, each composed of two or more layers, for example each composed of a layer of paper, of aluminium, and of weldable polymer, such as HDPE (high density polyethylene), Barex (PAN, polyacrylonitrile) or Surlyn (ethylene copolymer), and to bond these laps to one another at predetermined edges and/or lines by means of a heated sealing head while their polymer layers are lying against one another. To this end, the sealing head is pressed onto the laps to be bonded, and these are heated until under this head they exceed the melting point of the polymer layers, which therefore melt and enter into a cohesive bond with one another. This process can also be carried out using heated sealing heads arranged in opposite positions, and these may have the same or different temperatures, in order to accelerate the penetration of heat into the laps lying against one another. For example, the temperatures of each of two sealing heads may be 200° C. in the case of packaging laminate with a polymer layer made from Barex with a melting point of 177° C., and the temperature of one sealing head may be 200° C. and that of the other may be 70° C. in the case of a packaging laminate with a polymer layer made from HDPE with a melting point of 138° C.

In this welding process, since the sealing tool temperature is considerably higher than the melting point, there can be blistering due to evaporation of moisture in the region of the welding zone (Barex), or else there can be excessive pinching of the melted polymer (HDPE) as a result of the necessary but excessive pressure exerted by the sealing tool, and there can also be damage to the pack material, giving defective and incomplete welded seams.

The quality of the welded seams can be improved by lowering the sealing-tool temperatures and the sealing-tool pressure while increasing the sealing period—the residence time of the sealing tool on the pack material. However, this would also imply reducing the cycle rate of the welding machine, and this reduction would cause an undesirable reduction in the output of hot-seal packs.

The object of the invention is to provide a welding process for producing hot-seal packs, in particular for transdermal therapeutic systems, by transporting, in a predetermined cycle through a sealing unit, two laps of continuous pack material composed of two or more layers each having a weldable polymer layer lying against the other lap, and, using a sealing tool which acts upon both laps, in order to produce a weld along predetermined lines, bringing the laps into contact with pressure and with a temperature of above the melting point of the polymer, for a sealing period, which can improve the quality of the welded seams while the cycle rate of the welding machine remains the same, and to provide a sealing tool for carrying out the process.

This object is achieved in the welding process for producing hot-seal packs, in particular for transdermal therapeutic systems, as described above such that while the cycle remains the same there is an increase in the sealing period by a factor, in particular a factor of two, and in that there is a lowering of the temperature of the heated sealing heads of the sealing tool such that there is a considerable reduction in the temperature reached within the pack material, this temperature then being only slightly above the melting point of the polymer layer and using a sealing unit with heated sealing tools and a transport device for the pack material, characterized in that the sealing unit comprises two cooperating, heated sealing heads, said second sealing head being arranged or configured on the side of the pack material facing away from the first sealing head, and said sealing heads having, in succession in the direction of advance, two or more identical contact area structures corresponding to the predetermined weld lines for transmitting temperature and pressure to the pack material, with the length of one contact area structure in the direction of advance corresponding to the advancement cycle.

SUMMARY OF THE INVENTION

The invention envisages an increase in the sealing period, i.e. an increase by a factor deriving from the cycle. For simplicity, the specific case of "doubling" is referred to hereinafter. For the purposes of the invention, the term "doubling" includes increases by other factors.

DESCRIPTION OF THE PREFERRED EMBODIMENT

According to the invention, use is made of a known process, by transporting, in a predetermined cycle through a sealing unit, two laps of continuous pack material composed of two or more layers and in each case having a weldable polymer layer lying against the other lap, and, using a sealing tool there which acts upon one lap or a sealing tool which acts upon both laps, in order to produce a weld along predetermined lines, bringing the laps into contact with pressure and with a temperature of above the melting point of the polymer, for a sealing period and according to the invention doubling the sealing period without altering the cycle or the output, and by lowering the temperature of the sealing tool so that there is a considerable reduction in the temperature reached within the pack material, this temperature then being only slightly above the melting point of the polymer layer. This very substantially prevents blistering due to evaporation of moisture in the region of the welding zone, and thus considerably improves the quality of the welded seams.

In parallel with this, it is also possible to lower the pressure exerted by the sealing tool, thus avoiding excessive pinching of molten polymer and also avoiding damage to the pack material.

In order to increase the sealing period by a factor, in a particular a factor of two, the pack material, after being first brought into contact with pressure and with heat, may be advanced in the cycle, along the predetermined lines, go and brought into contact on a second occasion or on further occasions with pressure and with heat, using the same period, during the period in which the subsequent sealed-bag pack is first being brought into contact with pressure and with heat.

To carry out the process, a sealing tool has been developed which has, in succession in the direction of advance, two or more, preferably two, identical contact area structures corresponding to the predetermined weld lines, for placing onto the pack material in order to transfer pressure and heat. The length of one contact area structure in the direction of advance therefore corresponds to the advancement cycle, and therefore, immediately after the advancement cycle—and thus essentially without delay or cooling—the pack material which has been brought into contact with the first contact area structure by means of the sealing tool is brought into contact on a second occasion or on further occasions with heat and with pressure at the same locations, signifying an increase in the sealing period by a factor, in particular a factor of two.

This sealing tool can therefore work together with a second sealing tool which has the same contact area structure and which has been arranged or designed on that side of the pack material facing away from the first sealing tool.

BRIEF DESCRIPTION OF THE DRAWINGS

The invention is illustrated below using an example. The diagrams in the associated drawing are:

FIG. 1: a side view of a sealing unit,

FIG. 2: a view from below of a sealing head with a contact area structure,

FIGS. 3a and 3b: the method of advance in the process according to the invention, and FIG. 4: the cross section through a weld.

FIG. 1 shows a sealing unit which has two sealing heads 1 and 2, between which are passed two webs 3 and 4 of continuous pack material with, between these and at regular distances and at some distance from the web edges, transdermal therapeutic systems (TTSs) 5 inserted but not secured, for forming sealed-bag packs for these in the cycle. Heating (not shown) has been provided to the sealing heads 1 and 2, which are pressed against one another during a pause between advances.

The pack material has been formed from a layer made from paper 6, from an aluminium layer 7, and from a layer 8 made from a weldable polymer, the two webs 3 and 4 having been arranged (also FIG. 4) with their polymer layers facing towards the TTSs 5 and towards one another.

FIG. 2 shows that side of the sealing heads 1 and 2 which faces towards the pack material, with the contact areas 9 on each of these. These may have cross-grooving in order to enlarge the surface area. When the two sealing heads 1 and 2 are pushed apart, spaces form between the contact areas and, in a pause between advances, the areas with the TTSs 5 to be packed become positioned in these spaces.

The pack material (3, 4) with the inserted TTSs 5 is transported through the sealing unit within the cycle in order to produce closed sealed-bag packs. During a pause between advances, the two sealing heads 1 and 2 are pressed against one another. The temperatures selected for these depend on the melting point of the polymer used in the pack material, and may also be different, as shown by the examples below.

The contact with heat by way of the sealing heads 1 and 2, and the transfer of heat into the polymer layers, melt the polymer and produce a cohesive bond between the polymer layers. Since the temperature reached at the polymer layers as a consequence of the temperature at the sealing tools 1 and 2 is only slightly above the melting point of the polymer, the weld is weak and, on occasions, defective. In order to make the weld firm and defect-free, the sealing period is now doubled by bringing the still hot weld areas into contact again with pressure and with the same temperature, for the same period, immediately after the next cycle.

FIGS. 3a and 3b illustrate the process. In FIG. 3a the location of the sealed-bag pack I to be produced is in the rear position, based on the direction of advance, between the sealing heads 1 and 2. The forward sealing edge of these has been shown using dashes. Once the pause between advances has expired, this pause being essentially the same as the sealing period, the pack material (3, 4) is advanced and the sealed-bag pack I to be produced passes into the forward position, where it is again brought into contact with the same temperature and with the same pressure, by way of the same sealing head. The sealed-bag pack 0 has been brought into contact with heat only once, and is rejected. The sealed-bag pack II to be produced follows the first (I) and likewise is brought into contact twice in immediate succession, implying a doubling of the sealing period. The cycle here remains the same.

The two examples below show how the temperatures of the sealing tools 1 and 2 were lowered in comparison with the prior art with only one sealing procedure:

Prior art

| Polymer used | Melting point (° C.) | Temperature of sealing tools | | Cycles/h |
| --- | --- | --- | --- | --- |
| | | 1 (° C.) | 2 (° C.) | |
| HDPE | 138 | 197 | 72 | 3100 |
| Barex | 177 | 200 | 200 | 5800 |

Process of the invention

| Polymer used | Melting point (° C.) | Temperature of sealing tools | | Cycles/h |
| --- | --- | --- | --- | --- |
| | | 1 (° C.) | 2 (° C.) | |
| HDPE | 138 | 169 | 65 | 3100 |
| Barex | 177 | 200 | 80 | 5800 |

The invention has been described with particular emphasis on the preferred embodiments, but variations and modifications within the spirit and scope of the invention may occur to those skilled in the art to which the invention pertains.

What is claimed is:

1. Process for producing hot-seal packs for transdermal therapeutic systems, by transporting, in a predetermined cycle through a sealing unit, two laps, a first lap and a second lap, of continuous pack material composed of two or more layers, the first lap having a weldable polymer layer lying against the second lap, and the second lap having a weldable layer lying against the first lap, said first lap and said second lap each having predetermined weld lines, said process comprising:

pressing first areas of said laps together, by first contact area structures of two heated sealing heads, the two heat sealing heads including a first heated sealing head and a second heated sealing head, said first contact area structures corresponding to the predetermined weld lines;

advancing the pack material to bring said first area of said laps to second contact area structures of said two cooperating heated sealing heads, said second contact area structures corresponding to the predetermined weld lines;

pressing said first areas of said laps together by said second contact area structures, wherein said weldable polymer layer has a melting point of about 138° C. and said first heated sealing head has a temperature of about 169° C., and wherein said first heated sealing head and said second heated sealing head cooperate by being pressed against one another, the temperature of said first heated sealing head being set above the melting temperature of the weldable polymer in said laps, and the temperature of said second heated sealing head being set below the melting temperature of the weldable polymer in said laps, to produce a temperature above the melting point of the weldable polymer in said laps.

2. Process for producing hot-seal packs for transdermal therapeutic systems, by transporting, in a predetermined cycle through a sealing unit, two laps, a first lap and a second lap, of continuous pack material composed of two or more layers, the first lap having a weldable polymer layer lying against the second lap, and the second lap having a weldable layer lying against the first lap, said first lap and said second lap each having predetermined weld lines, said process comprising:

pressing first areas of said laps together, by first contact area structures of two heated sealing heads, the two heat sealing heads including a first heated sealing head and a second heated sealing head, said first contact area structures corresponding to the predetermined weld lines;

advancing the pack material to bring said first area of said laps to second contact area structures of said two cooperating heated sealing heads, said second contact area structures corresponding to the predetermined weld lines;

pressing said first areas of said laps together by said second contact area structures, wherein said weldable polymer layer has a melting point of about 138° C. and said first heated sealing head has a temperature of about 169° C., and wherein said first heated sealing head and said second heated sealing head cooperate by being pressed against one another, the temperature of said first heated sealing head being set above the melting temperature of the weldable polymer in said laps, and the temperature of said second heated sealing head being set below the melting temperature of the weldable polymer in said laps, to produce a temperature above the melting point of the weldable polymer in said laps, wherein said second heated sealing head has a temperature of about 65° C.

3. The process according to claim 2, wherein said weldable polymer layer comprises high density polyethylene.

4. Process for producing hot-seal packs for transdermal therapeutic systems, by transporting, in a predetermined cycle through a sealing unit, two laps, a first lap and a second lap, of continuous pack material composed of two or more layers, the first lap having a weldable polymer layer lying against the second lap, and the second lap having a weldable layer lying against the first lap, said first lap and said second lap each having predetermined weld lines, said process comprising:

pressing first areas of said laps together, by first contact area structures of two heated sealing heads, the two heat sealing heads including a first heated sealing head and a second heated sealing head, said first contact area structures corresponding to the predetermined weld lines;

advancing the pack material to bring said first area of said laps to second contact area structures of said two cooperating heated sealing heads, said second contact area structures corresponding to the predetermined weld lines;

pressing said first areas of said laps together by said second contact area structures, wherein said weldable polymer layer has a melting point of about 177° C. and said first heated sealing head has a temperature of about 200° C. and said second heated sealing head has a temperature of 80° C., and wherein said first heated sealing head and said second heated sealing head cooperate by being pressed against one another, the temperature of said first heated sealing head being set above the melting temperature of the weldable polymer in said laps, and the temperature of said second heated sealing head being set below the melting temperature of the weldable polymer in said laps, to produce a temperature above the melting point of the weldable polymer in said laps.

5. The process according to claim 4, wherein said weldable polymer layer comprises polyacrylonitrile.

* * * * *